United States Patent Office 3,479,348
Patented Nov. 18, 1969

3,479,348
QUINOXALINE DERIVATIVES
Hisao Yamamoto, Nishinomiya, Masaru Nakao, Osaka,
and Isamu Maruyama, Minoo, Japan, assignors to
Sumitomo Chemical Co., Ltd., Osaka, Japan
No Drawing. Filed Nov. 14, 1967, Ser. No. 683,003
Claims priority, application Japan, Nov. 16, 1966,
41/75,624; Dec. 13, 1966, 41/81,925; Dec. 15,
1966, 41/82,479; Aug. 28, 1967, 42/55,419; Aug.
29, 1967, 42/55,684, 42/55,685, 42/55,687
Int. Cl. C07d 51/78; A61k 27/00
U.S. Cl. 260—240                    11 Claims

ABSTRACT OF THE DISCLOSURE

Novel 4-acyl-3,4-dihydro-2(1H)-quinoxalinone derivatives of the formula:

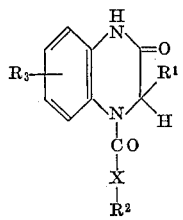

wherein $R^1$ is a hydrogen atom or a lower alkyl, $R^2$ is an aromatic or oxygen-, sulfur- or nitrogen-containing heterocyclic group substituted or not with halogen, alkoxy, nitro or alkyl, $R^3$ is a hydrogen atom, an alkoxy, an alkylthio, a halogen atom or an alkyl, and X is a saturated or unsaturated aliphatic hydrocarbon chain having not more than four carbon atoms.

The compounds indicate excellent anti-inflammatory action with low toxicity.

---

The present invention relates to novel 4-acyl-3,4-dihydro-2(1H)-quinoxalinone derivatives, processes for producing the same and pharmaceutical compositions containing the same.

More particularly, it relates to novel 4-acyl-3,4-dihydro-2(1H)-quinoxalinone derivatives represented by the formula:

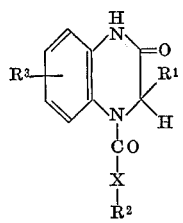

(I)

wherein $R^1$ is a hydrogen atom or a lower alkyl, $R^2$ is an aromatic or oxygen-, sulfur- or nitrogen-containing heterocyclic group substituted or not with halogen, alkoxy, nitro or alkyl, $R_3$ is a hydrogen atom, an alkoxy, an alkylthio, a halogen atom or an alkyl, and X is a saturated or unsaturated aliphatic hydrocarbon chain having not more than 4 carbon atoms.

Of the novel 3,4-dihydro-2(1H)-quinoxalinone derivatives of the present invention, a number of compounds exhibit marked anti-inflammatory, anti-pyretic and analgesic activities with low toxicity. The object of this invention is to produce these valuable compounds with industrial advantage.

According to the process of the present invention, the 4-acyl-3,4-dihydro-2(1H)-quinoxalinone derivative (I) is prepared by treating a phenylene diamido compound of the formula:

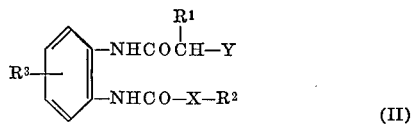

(II)

wherein Y is a halogen atom or an ester residue and $R^1$, $R^2$, $R^3$ and X are each as defined in the Formula I with a base in a solvent.

In carrying out the process of the present invention, there may be used as the solvent an ordinary organic solvent, particularly an alcohol or a glycol ether. Examples of the base are inorganic alkalis such as potassium carbonate, sodium bicarbonate and sodium hydroxide, organic bases such as triethylamine and pyridine and alkali metal alkoxides such as sodium methoxide. The reaction can proceed at a temperature between 10 and 100° C. but is preferably executed from 35 to 90° C. The reaction time is from 1 hour to 1 week. After the reaction is completed, the reaction mixture is concentrated under reduced pressure so as to remove the solvent or added as such to a suitable amount of water while stirring whereby the objective compound is obtained. For purification, it may be recrystallized from a solvent such as ethanol, ethanol-water, acetone-water, ether or dioxane. In the preparation, the hydrogen halide-eliminating cyclization reaction is accomplished quantitatively.

By the above process, there are readily obtained the following novel compounds:
4-cinnamoyl-7-methoxy-3,4-dihydro-2(1H)-
 quinoxalinone,
4-(p-chlorocinnamoyl)-7-methoxy-3,4-dihydro-2(1H)-
 quinoxalinone,
4-cinnamoyl-6-methoxy-3,4-dihydro-2(1H)-
 quinoxalinone,
4-(β-cinnamylacryloyl)-7-methoxy-3,4-dihydro-
 2(1H)-quinoxalinone,
4-(2'-pyridylacryloyl)-7-methoxy-3,4-dihydro-2(1H)-
 quinoxalinone,
4-(5'-methoxyindolyl-3'-acetyl)-7-methoxy-3,4-dihydro-
 2(1H)-quinoxalinone,

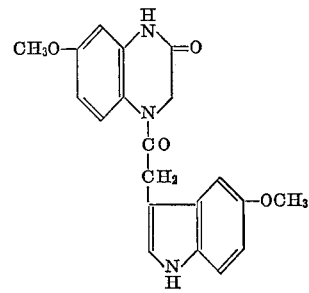

3-methyl-4-cinnamoyl-7-methoxy-3,4-dihydro-
 2(1H)-quinoxalinone,
4-phenylacetyl-7-methylthio-3,4-dihydro-2(1H)-
 quinoxalinone,
4-phenylacetyl-7-methyl-3,4-dihydro-2(1H)-
 quinoxalinone,
4-phenylacetyl-7-chloro-3,4-dihydro-2(1H)-
 quinoxalinone,
4-phenylacetyl-3,4-dihydro-2(1H)-quinoxalinone,
4-(β-phenylpropionyl)-3,4-dihydro-2(1H)-
 quinoxalinone,
3-methyl-4-phenylacetyl-6-methoxy-3,4-dihydro-2(1H)-
 quinoxalinone,
4-(γ-phenylbutyroyl)-3,4-dihydro-2(1H)-quinoxalinone,
 quinoxalinone, 4-(2'-pyridylacetyl)-7-methoxy-3,4-dihydro-2(1H)-
 quinoxalinone,
4-(2'-furylacryloyl)-7-methoxy-3,4-dihydro-2(1H)-
 quinoxalinone,
4-(2'-thienylacetyl)-7-methoxy-3,4-dihydro-2(1H)-
 quinoxalinone,
4-(2'-naphthylacetyl)-7-methoxy-3,4-dihydro-2(1H)-
 quinoxalinone,
4-(2'-methyl-5'-methoxyindolyl-3'-acetyl)-7-methoxy-
 3,4-dihydro-2(1H)-quinoxalinone,

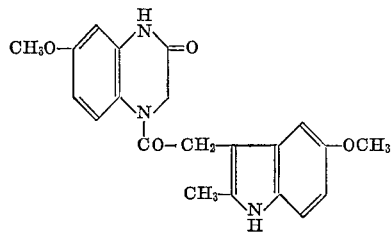

4-phenylacetyl-8-methyl-3,4-dihydro-2(1H)-quinoxali-
 none,
4-(δ-phenyl-n-valeroyl)-3,4-dihydro-2(1H)-quinoxali-
 none,
4-(p-tolylacetyl)-7-methoxy-3,4-dihydro-2(1H)-quinoxa-
 linone,
4-(p-methoxyphenylacetyl)-7-methoxy-3,4-dihydro-
 2(1H)-quinoxalinone,
4-(p-chlorophenylacetyl)-7-methoxy-3,4-dihydro-2(1H)-
 quinoxalinone,
4-(p-chlorophenylacetyl)-7-methylthio-3,4-dihydro-
 2(1H)-quinoxalinone,
4-(p-nitrophenylacetyl)-7-methoxy-3,4-dihydro-2(1H)-
 quinoxalinone,
4-(p-tolylacetyl)-3,4-dihydro-2(1H)-quinoxalinone, etc.

The 4-acyl-3,4-dihydro-2(1H)-quinoxalinone derivative (I) is also prepared by reducing an N-(o-nitrophenyl)-N-acylglycine derivative of the formula:

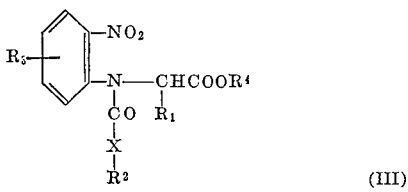

wherein $R^4$ is a hydrogen atom, a lower alkyl group or a benzyl group and $R^1$, $R^2$, $R^3$ and X are each as defined in the Formula I in the presence of a catalyst.

As the catalyst in the reduction, there may be used palladium, platinum, copper, nickel or the like. Examples of the reaction medium are alcohols such as methanol and ethanol, cyclic ethers such as dioxane and tetrahydrofuran, aromatic compounds such as benzene and toluene, ethers such as diethyl ether and esters such as ethyl acetate. The reaction is in general effected with facility at room temperature under ordinary pressure in several minutes to several hours. Heating or elevated pressure may accelerate the reaction.

In the above preparation, the cyclization reaction proceeds via an intermediary amino compound of the formula:

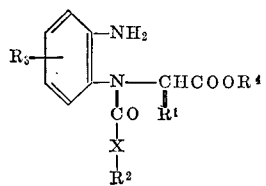

wherein $R^1$, $R^2$, $R^3$, $R^4$ and X are each as defined above. For instance, the reaction may proceed as follows:

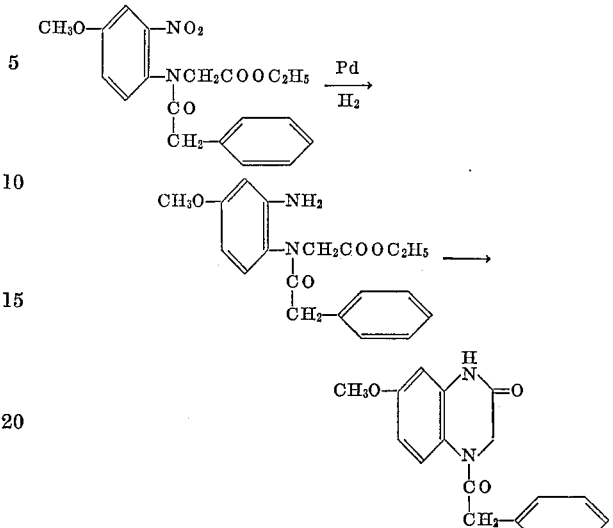

When the preparation is carried out, there may be actually produced the said intermediary amino compound. This compound can be readily cyclized to the objective compound by treatment with an acid. Attention, however, should be taken to the regulation of the condition, because a drastic condition results in the fission of the acid amide bond.

By the above preparation, there are easily obtained the following novel compounds:

4-phenylacetyl-7-methoxy-3,4-dihydro-2(1H)-quinoxa-
 linone,
4-(β-phenylpropionyl)-3,4-dihydro-2(1H)-quinoxalinone,
3-methyl-4-phenylacetyl-6-methoxy-3-dihydro-2(1H)-
 quinoxalinone,
4-(γ-phenylbutyroyl)-3,4-dihydro-2(1H)-quinoxalinone,
4-(2'-pyridylacetyl)-7-methoxy-3,4-dihydro-2(1H)-
 quinoxalinone,
4-(2'-methyl-5'-methoxyindolyl-3'-acetyl)-7-methoxy-
 3,4-dihydro-2(1H)-quinoxalinone,
4-phenylacetyl-7-methyl-3,4-dihydro-2(1H)-quinoxa-
 linone,
4-(δ-phenyl-n-valeroyl)-3,4-dihydro-2(1H)-quinoxa-
 linone,
4-(p-tolylacetyl)-7-methoxy-3,4-dihydro-2(1H)-quinoxa-
 linone,
4-(p-methoxyphenylacetyl)-7-methoxy-3,4-dihydro-
 2(1H)-quinoxalinone,
4-(p-chlorophenylacetyl)-7-methoxy-3,4-dihydro-2(1H)-
 quinoxalinone,
4-(p-chlorophenylacetyl)-7-methylthio-3,4-dihydro-
 2(1H)-quinoxalinone,
4-phenylacetyl-6-methoxy-3,4-dihydro-2(1H)-quinoxa-
 linone,
4-(p-tolylacetyl)-3,4-dihydro-2(1H)-quinoxalinone,
4-phenylacetyl-7-chloro-3,4-dihydro-2(1H)-quinoxali-
 none, etc.

The 4-acyl-3,4-dihydro-2(1H)-quinoxalinone derivative (I) is also prepared by reacting a quinoxalinone compound of the formula:

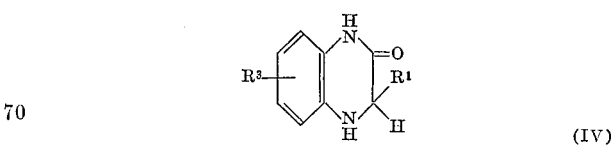

wherein $R^1$ and $R^3$ are each as defined in the Formula I with a compound of the formula:

$$R^2-CO-X-Z \qquad (V)$$

wherein Z is a halogen atom or an ester residue and $R^2$ and X are each as defined in the Formula I.

The reaction is carried out in the presence of a basic agent such as a teritiary amine (e.g. pyridine, triethylamine, dimethylaniline) or an inorganic alkali (e.g. potassium carbonate, sodium carbonate, potassium hydroxide, sodium hydroxide, sodium bicarbonate) in a solvent, ordinarily an organic solvent (e.g. benzene, toluene, petroleum ether, petroleum benzin, ether, dioxane, tetrahydrofuran, ethyl acetate, pyridine, dimethylformamide) or sometimes water. As the compound (V), the use of an acid halide or an acid anhydride is preferred. The reaction proceeds at a temperature from —20 to 100° C. and is accomplished normally in 30 minutes to several hours. After the reaction is completed, the reaction mixture is concentrated under reduced pressure, cooled as such or admixed with an insoluble solvent to obtain the objective compound as crystalline solid. Recrystallization from a suitable solvent affords the pure substance.

By the above preparation, there are obtained with facility the following novel compounds:

4-cinnamoyl-7-methoxy-3,4-dihydro-2(1H)-quinoxalinone,
4-(p-chlorocinnamoyl)-7-methoxy-3,4-dihydro-2(1H)-quinoxalinone,
4-cinnamoyl-6-methoxy-3,4-dihydro-2(1H)-quinoxalinone,
4-(β-styrylacryloyl)-7-methoxy-3,4-dihydro-2(1H)-quinoxalinone,

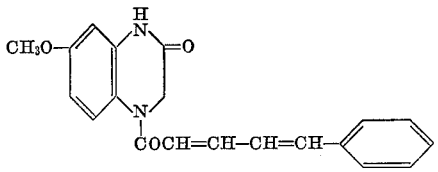

4-(2'-pyridylacryloyl)-7-methoxy-3,4-dihydro-2(1H)-quinoxalinone,
4-(5'-methoxyindolyl-3'-acetyl)-7-methoxy-3,4-dihydro-2(1H)-quinoxalinone,
3-methyl-4-cinnamoyl-7-methoxy-3,4-dihydro-2(1H)-quinoxalinone,
4-(p-chlorocinnamoyl)-6-methoxy-3,4-dihydro-2(1H)-quinoxalinone,
4-(m-nitrocinnamoyl)-7-methoxy-3,4-dihydro-2(1H)-quinoxalinone,
4-(p-methylcinnamoyl)-7-methoxy-3,4-dihydro-2(1H)-quinoxalinone,
4-cinnamoyl-7-methyl-thio-3,4-dihydro-2(1H)-quinoxalinone,
4-phenylacetyl-7-methoxy-3,4-dihydro-2(1H)-quinoxalinone,
4-phenylacetyl-7-methyl-3,4-dihydro-2(1H)-quinoxalinone,
4-phenylacetyl-7-chloro-3,4-dihydro-2(1H)-quinoxalinone,
4-phenylacetyl-3,4-dihydro-2(1H)-quinoxalinone, etc.

The 4-acyl-3,4-dihydro-2(1H)-quinoxalinone derivative (I) is also prepared by reacting an o-aminoanilide derivative of the formula:

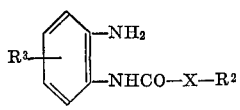

(VI)

wherein $R^2$, $R^3$ and X are each as defined in the Formula I with a compound of the formula:

(VII)

wherein $R^1$, Y and Z are each as defined above and treating the resultant o-phenylene diamide derivative (II) with a base.

In this preparation, the reaction between the o-aminoanilide derivative (VI) and the compound (VII) is executed in the presence of an inorganic alkali such as sodium bicarbonate or sodium hydroxide or an organic base such as pyridine or triethylamine in an inert organic solvent such as benzene, toluene, ether, tetrahydrofuran, cyclohexane or ethyl acetate. The reaction can proceed below 0° C. but is preferred to effect at a temperature from 0° C. to room temperature, sometimes while heating. After the completion of the reaction, the reaction mixture is concentrated under reduced pressure or added as such to a suitable amount of water while stirring to give the product, which may be purified by recrystallization from ethanol, ethanol-water, acetone-water, ether, dioxane or the like. The yield of the product is quantitative.

The compound (VI) used as the starting material in the above preparation is novel and may be produced by acylating the corresponding o-nitroaniline derivative, followed by catalytic reduction. Examples of the compound (VII) are bromoacetyl bromide, chloroacetayl chloride, α-chloropropionyl chloride, tosyloxyacetyl chloride, chloroacetyl tosylate and chloroacetyl anhydride.

Examples of the obtained o-phenylene diamide derivative are as follows:

$N^1$-cinnamoyl-$N^2$-chloroacetyl-4-methoxy-o-phenylene diamide,
$N^1$-(p-chlorocinnamoyl)-$N^2$-chloroacetyl-4-methoxy-o-phenylene diamide,
$N^1$-cinnamoyl-$N^2$-chloroacetyl-4-methyl-o-phenylene diamide,
$N^1$-(p-methylcinnamoyl)-$N^2$-chloroacetyl-4-methoxy-o-phenylene diamide,
$N^1$-cinnamoyl-$N^2$-bromoacetyl-4-methoxy-o-phenylene diamide,
$N^1$-(p-methoxycinnamoyl)-$N^2$-chloroacetyl-4-methoxy-o-phenylene diamide,
$N^1$-cinnamoyl-$N^2$-tosyloxyacetyl-4-methoxy-o-phenylene diamide,
$N^1$-cinnamoyl-$N^2$-chloroacetyl-4-chloro-o-phenylene diamide,
$N^1$-cinnamoyl-$N^2$-α-chloropropionyl-4-methoxy-o-phenylene diamide,
$N^1$-cinnamoyl-$N^2$-chloroacetyl-5-methoxy-o-phenylene diamide,
$N^1$-(β-styrylacryloyl)-$N^2$-chloroacetyl-4-methoxy-o-phenylene diamide,
$N^1$-(β-2'-pyridylacryloyl)-$N^2$-chloroacetyl-4-methoxy-o-phenylene diamide,
$N^1$-(β-2-pyridylacryloyl)-$N^2$-chloroacetyl-4-methoxy-o-phenylene diamide,
$N^1$-(5'-methoxy-3-indolylacetyl)-$N^2$-chloroacetyl-o-phenylene diamide,
$N^1$-(β-2'-furylacryloyl)-$N^2$-chloroacetyl-4-methoxy-o-phenylene diamide,
$N^1$-phenylacetyl-$N^2$-chloroacetyl-4-methoxy-o-phenylene diamide,
$N^1$-(β-2'-thienylacryloyl)-$N^2$-chloroacetyl-4-methoxy-o-phenylene diamide,
$N^1$-(5'-methoxy-3'-indolylacetyl)-$N^2$-chloroacetyl-4-methoxy-o-phenylene diamide,
$N^1$-phenylacetyl-$N^2$-chloroacetyl-4-methyl-o-phenylene diamide,
$N^1$-phenylacetyl-$N^2$-chloroacetyl-4-chloro-o-phenylene diamide,
$N^1$-phenylacetyl-$N^2$-chloroacetyl-o-phenylene diamide,
$N^1$-naphthylacetyl-$N^2$-chloroacetyl-4-chloro-o-phenylene diamide, etc.

The thus obtained o-phenylene diamide derivative (II) is treated with a base as illustrated above to give the 4-acyl-3,4-dihydro-2(1H)-quinoxalinone derivative (I).

The 4-acyl-3,4-dihydro-2(1H)-quinoxalinone derivative (I) is also prepared by reducing an o-nitroanilide derivative of the formula:

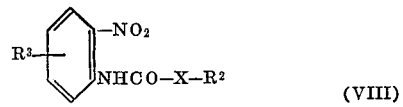

(VIII)

wherein $R^2$, $R^3$ and $X$ are each as defined in the Formula I, reacting the resultant o-aminoanilide derivative (VI) with the compound (VII) and treating the resulting o-phenylene diamide derivative (II) with a base.

The conversion is representable by the following formulae:

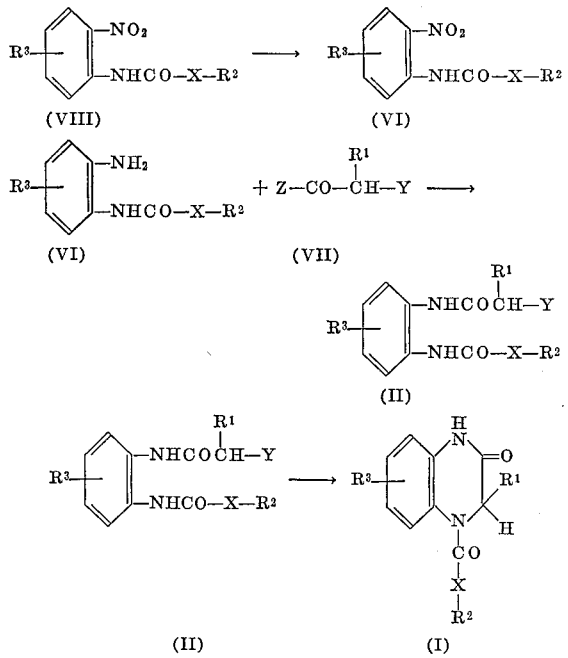

wherein $R^1$, $R^2$, $R^3$, $X$, $Y$ and $Z$ are each as defined above.

In the above conversion, the step for the production of the compound (II) from the compound (VI) and the compound (VII) and the step for the production of the compound (I) from the compound (II) may be carried out as illustrated above. The step for the reduction of the o-nitroanilide derivative (VIII) to the o-aminoanilide derivative (VI) may be effected as follows.

When the reduction is executed in an alkaline or acidic medium, the acid amide bond at the $N^1$-position is cloven and the objective compound can not be produced. Thus, the execution of the reduction in a neutral medium is essential. The most preferred procedure is catalytic reduction. Besides, there may be also adopted a conventional reduction procedure using a metal such as zinc, iron, magnesium or tin. In this case, water, alcohols, aqueous alcohols or any other inert solvents may be used. In addition, there may be also employed ammonium chloride, sodium chloride, acetic acid or the like. In general, heating can promote the reaction.

Examples of the o-aminoanilide derivative prepared as above are as follows:

$N^1$-cinnamoyl-2-amino-4-methoxyanilide,
$N^1$-(p-chlorocinnamoyl)-2-amino-4-methoxyanilide,
$N^1$-cinnamoyl-2-amino-4-methylanilide,
$N^1$-(p-methylcinnamoyl)-2-amino-4-methoxyanilide,
$N^1$-(p-methoxycinnamoyl)-2-amino-4-methoxyanilide,
$N^1$-cinnamoyl-2-amino-4-chloroanilide,
$N^1$-cinnamoyl-2-amino-5-methoxyanilide,
$N^1$-phenylacetyl-2-aminoanilide,
$N^1$-naphthylacetyl-2-aminoanilide,
$N^1$-($\beta$-styrylacryloyl)-2-amino-4-methoxyanilide,
$N^1$-($\beta$-2-pyridylacryloyl)-2-amino-4-methoxyanilide,
$N^1$-(5-methoxy-3-indolylacetyl)-2-aminoanilide,
$N^1$-($\beta$-furylacryloyl)-2-amino-4-methoxyanilide,
$N^1$-phenylacetyl-2-amino-4-methoxyanilide,
$N^1$-($\beta$-2-thienylacryloyl)-2-amino-4-methoxyanilide,
$N^1$-(5-methoxy-3-indolylacetyl)-2-amino-4-methoxyanilide,
$N^1$-phenylacetyl-2-amino-4-methylanilide,
$N^1$-phenylacetyl-2-amino-4-chloroanilide, etc.

The 4-acyl-3,4-dihydro-2(1H)-quinoxalinone derivative (I) is also prepared by reacting an o-aminoanilide derivative of the formula:

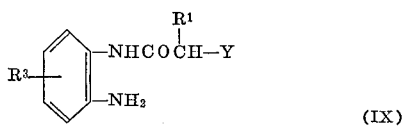

wherein $R^1$, $R^3$ and $Y$ are each as defined in the Formula I with a compound of the formula:

$$Z-CO-X-R^2 \qquad (V)$$

wherein $R^2$, $X$ and $Z$ are each as defined above and treating the resultant o-phenylene diamide derivative (II) with a base.

In this preparation, the reaction between the o-aminoanilide derivative (IX) and the compound (V) is effected in a solvent such as benzene, toluene, ether, tetrahydrofuran, cyclohexane, pyridine or dimethylformamide. For eliminating the acid produced in the course of the reaction, the presence of a base is preferred. Illustrating for reference, the o-aminoanilide derivative (IX) may be obtained by acylating the corresponding o-nitroaniline derivative and reducing the resultant product. As the compound (V), there may be employed not only a halide but also a tosylate, an acid anhydride or the like.

By the above preparation, there are easily obtained the following o-phenylene diamide derivatives:

$N^1$-cinnamoyl-$N^2$-chloroacetyl-4-methoxy-o-phenylene diamide,
$N^1$-(p-chlorocinnamoyl)-$N^2$-chloroacetyl-4-methoxy-o-phenylene diamide,
$N^1$-cinnamoyl-$N^2$-chloroacetyl-4-methyl-o-phenylene diamide,
$N^1$-(p-methylcinnamoyl)-$N^2$-chloroacetyl-4-methoxy-o-phenylene diamide,
$N^1$-cinnamoyl-$N^2$-bromoacetyl-4-methoxy-o-phenylene diamide,
$N^1$-(p-methoxycinnamoyl)-$N^2$-chloroacetyl-4-methoxy-o-phenylene diamide,
$N^1$-cinnamoyl-$N^2$-tosyloxyacetyl-4-methoxy-o-phenylene diamide,
$N^1$-cinnamoyl-$N^2$-chloroacetyl-4-chloro-o-phenylene diamide,
$N^1$-cinnamoyl-$N^2$-chloroacetyl-5-methoxy-o-phenylene diamide,
$N^1$-($\beta$-styrylacryloyl)-$N^2$-chloroacetyl-4-methoxy-o-phenylene diamide,
$N^1$-($\beta$-2'-pyridylacryloyl)-$N^2$-chloroacetyl-4-methoxy-o-phenylene diamide,
$N^1$-($\beta$-2-pyridylacryloyl)-$N^2$-chloroacetyl-4-methoxy-o-phenylene diamide,
$N^1$-(5'-methoxy-3'-indolylacetyl)-$N^2$-chloroacetyl-o-phenylene diamide,
$N^1$-($\beta$-2'-furylacryloyl)-$N^2$-chloroacetyl-4-methoxy-o-phenylene diamide,
$N^1$-phenylacetyl-$N^2$-chloroacetyl-4-methoxy-o-phenylene diamide,
$N^1$-($\beta$-2'-thienylacryloyl)-$N^2$-chloroacetyl-4-methoxy-o-phenylene diamide,
$N^1$-(5'-methoxy-3'-indolyacetyl)-$N^2$-chloroacetyl-4-methoxy-o-phenylene diamide,
$N^1$-phenylacetyl-$N^2$-chloroacetyl-4-methyl-o-phenylene diamide,
$N^1$-phenylacetyl-$N^2$-chloroacetyl-4-chloro-o-phenylene diamide,
$N^1$-cinnamoyl-$N^2$-$\alpha$-chloropropionyl-4-methoxy-o-phenylene diamide,
$N^1$-naphthylacetyl-$N^2$-chloroacetyl-4-chloro-o-phenylene diamide,
$N^1$-phenylacetyl-$N^2$-chloroacetyl-o-phenylene diamide, etc.

The 4-acyl-3,4-dihydro-2(1H)-quinoxalinone derivative (I) is further prepared by reacting an o-nitrophenylglycine derivative of the formula:

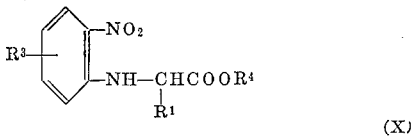

wherein $R^1$, $R^3$ and $R^4$ are each as defined above with an acylating agent of the Formula V and reducing the resultant N-(o-nitrophenyl)-N-acylglycine derivative (III) in the presence of a catalyst.

The acylation may be carried out normally in an organic solvent in the presence of a basic reagent. As the solvent, there is used benzene, toluene, petroleum ether, petroleum benzin, ether, dioxane, tetrahydrofuran, ethyl acetate, pyridine, dimethylformamide or the like. In some cases, water is used, too. Examples of the basic reagent are tertiary amines such as pyridine, triethylamine and dimethylaniline and inorganic alkalis such as potassium carbonate, sodium carbonate, potassium hydroxide, sodium hydroxide and sodium bicarbonate. The reaction can proceed at a temperature below 0° C. but may be effected at room temperature or under mildly heating. As the acylating agent, there may be used an acid chloride, an acid bromide, an acid anhydride, a tosyl ester, etc.

Specific examples of the substituents in the compounds prepared by the above acylation are as follows:

$R^1$: hydrogen, methyl ethyl.

$R^2$-X-CO: cinnamoyl, p-nitrocinnamoyl, p-chlorocinnamoyl, p-methoxycinnamoyl, p-methylcinnamoyl, β-styrylacryloyl, p-ethoxycinnamoyl, p-bromocinnamoyl, β-2-pyridylacrloyl, β-2-furylacryloyl, β-2-thienylacryloyl, 5-methoxy-3-indolylacetyl, phenylacetyl, 2-pyridylacetyl, 5-methoxy-2-methyl-3-indolylacetyl, α-naphthylacryloyl, γ-phenylbutyroyl, β-phenylpropionyl.

$R^3$: hydrogen, methoxy, ethoxy, methylthio, ethylthio, chlorine, bromine, methyl, ethyl.

$R^4$: methyl, ethyl, isopropyl, t-butyl, benzyl.

The thus obtained N-(o-nitrophenyl)-N-acylglycine derivative (III) can be reduced in the presence of a catalyst to the objective 4-acyl-3,4-dihydro-2(1H)-quinoxalinone derivative (I), as illustrated above.

Among novel 4-acyl-3,4-dihydro-(2(1H)-quinoxalinone derivatives of the present invention, there are not only a few useful compounds, which indicate excellent anti-inflammatory action but also possess extremely low toxicity.

In contrast to the above facts, the many compounds of this invention are markedly low in toxicity, and even when over 1,000 mg./kg. of these compounds are orally administrated to each of rat and mouse, they scarcely show toxic symptoms and occult bleading is negative in feces thereof. Nevertheless, the activities of these compounds are much higher than those of 1,2-diphenyl-3,5-dioxo-4-n-butylpyrazolidine (phenylbutazone) and oxyphenbutazone. Therefore, the therapeutic ratios of the compounds of the present invention are far greater than any other drugs. Therefore, these compounds are markedly valuable in practical use.

The therapeutic ratios of these compounds of the present invention, 1-(p-chlorobenzoyl)-2-methyl-5-methoxy-3-indolyacetic acid (Indomethacin) and 1,2-diphenyl-3,5-dioxo-4-n-butylpyrazolidine (Phenylbutazone) are given in the following table.

The present inventors prepared many other 4-acyl-3,4-dihydro-2(1H)-quinoxalinone derivatives than the compounds shown in the aforesaid table and evaluated the pharmaceutical effects thereof by animal tests.

The present inventors have found that many derivatives (I) of 4-acyl-3,4-dihydro-2(1H)-quinoxalinone, which are prepared by the present invention, are superior to 1-(p-chlorobenzoyl)-2-methyl-5-methoxy-3-indolylacetic acid (Indomethacin) and 1,2-diphenyl-3,5-dioxo-4-n-butylpyrazolidine (Phenylbutazone) in the therapeutic ratios thereof and has a great practical value.

It has found that these compounds also have comparatively potent analgesic activities shown by Haffner's method, and antipyretic activities in a pyrogen test.

The following examples are given to illustrate the present invention more particularly but it is not intended to limit the present invention only to them.

EXAMPLE 1

A mixture of $N^1$-chloroacetyl-$N^2$-cinnamoyl-5-methoxy-o-phenylene diamine (10 g.), triethylamine (4.6 g.) and potassium carbonate (3.3 g.) in methyl Cellosolve (70 ml.) is heated at 80° C. for 6 hours. The precipitate is eliminated by filtration. The filtrate is concentrated under reduced pressure and admixed with methanol (30 ml.). The precipitated crystals are collected by filtration and washed with a small amount of methanol to give 4-cinnamoyl-7-methoxy-3,4-dihydro-2(1H)-quinoxalinone (7.3 g.). M.P. 233 to 236° C. Recrystallization from dioxane affords pure crystals (5.7 g.) melting at 236 to 237° C.

EXAMPLE 2

A mixture of $N^1$-phenylacetyl-$N^2$-chloroacetyl-4-methyl-o-phenylene diamine (2.7 g.), potassium carbonate (0.8 g.) and triethylamine (1.0 g.) in methyl Cellosolve (25 ml.) is stirred at 90° C. for 4 hours. The reaction mixture is filtered. The filtrate is concentrated under reduced pressure to dryness. The residue is recrystallized from a mixture of methanol and water to give 4-phenylacetyl-7-methyl-3,4-dihydro-2(1H)-quinoxalinone as yellow crystals. M.P. 148–149° C.

EXAMPLE 3

To a solution of metalic sodium (0.2 g.) in anhydrous methanol (30 ml.), there is added $N^1$-cinnamoyl-$N^2$-chloroacetyl-4-chloro-o-phenylene diamine (2.9 g.), and the resultant solution is refluxed for 3 hours. The reaction mixture is filtered. The filtrate is concentrated under reduced pressure to dryness. The residue is recrystallized from a mixture of methanol and water to give 4-cinnamoyl-7-chloro-3,4-dihydro-2(1H)-quinoxalinone as yellow crystals melting at 220 to 221° C.

EXAMPLE 4

To a solution of metallic sodium (0.7 g.) in anhydrous methanol (100 ml.), there is added $N^1$-(β-phenylpropionyl)-$N^2$-chloroacetyl-4-methoxy-o-phenylene diamine (10.5 g.), and the resultant solution is refluxed for 1 hour while stirring. The precipitate is eliminated by filtration. The filtrate is concentrated under reduced pressure to dryness. The residue is recrystallized from benzene to give 4-(β-phenylpropionyl)-7-methoxy-3,4-dihydro-2(1H)-quinoxalinone. M.P. 162–164° C.

| Compound | 50% inhibiting dose of carrageenin edema of rat's hind paw, per os (mg./kg.) | 50% lethal dose of rat, per os (mg./kg.) | Therapeutic ratio (50% lethal dose/50% inhibiting dose o) carrageenin edemaf |
|---|---|---|---|
| 1-(p-chlorobenzoyl)-2-methyl-5-methoxy-3-indolylacetic acid (indomethacin) | 7.5 | 15 | 2.0 |
| 1,2-diphenyl-3,5-dioxo-4-n-butylpyrazolidin (phenyl butazone) | 320 | 600 | 1.9 |
| 4-cinnamoyl-7-methoxy-3,4-dihydro-2(1H)-quinoxalinone (present compound) | 120 | >1,000 | >8.3 |
| 4-cinnamoyl-7-chloro-3,4-dihydro-2(1H)-quinoxalinone (present compound) | 130 | >1,000 | >7.7 |

EXAMPLE 5

In the same manner as above, there is obtained 4-($\beta$-2'-furylacryloyl) - 7 - methoxy - 3,4 - dihydro - 2(1H)-quinoxalinone. M.P. 253–254° C.

EXAMPLE 6

$N^1$-(2' - methyl - 5' - methoxy - 4' - indolylacetyl)-$N^2$-chloroacetyl-4-methoxy-o-phenylene diamine (5.4 g.) and potassium carbonate (1.0 g.) are added to methyl Cellosolve (50 ml.), and the resultant mixture is heated at 90° C. for 4 hours while stirring. The precipitate is eliminated by filtration. The filtrate is concentrated under reduced pressure to dryness. The residue is recrystallized from a mixture of methanol and benzene to give 4-(2'-methyl-5'-methoxy-3'-indolylacetyl)-7-methoxy - 3,4 - dihydro-2(1H)-quinoxalinone as yellow crystals. M.P. 222–224° C.

EXAMPLE 7

$N^1$-phenylacetyl-$N^2$-chloroacetyl - 14 - methoxyphenylene diamine (10 g.) and triethylamine (4.6 g.) are added to methyl Cellosolve (70 ml.), and the resultant mixture is heated at 85 to 90° C. for 4 hours while stirring. After cooling, a small amount of the precipitate is eliminated by filtration. The filtrate is concentrated under reduced pressure to dryness. The residue is recrystallized from a mixture of methanol and water to give 4-phenylacetyl-7-methoxy-3,4-dihydro-2(1H)-quinoxalinone as yellow crystals melting at 152 to 154° C.

EXAMPLE 8

In the same manner as above, there is obtained 4-($\beta$-2'-furylacryloyl) - 7 - methoxy - 3,4 - dihydro - 2(1H) - quinoxalinone. M.P. 253–254° C.

EXAMPLE 9

To a mixture of N - (o - nitro - p - methoxyphenyl)-N-phenylacetylglycine (2.0 g.) and methanol (100 ml.), there is added 5% paladium-carbon (0.4 g.), and the resultant mixture is shaken with hydrogen at room temperature. Then, the catalyst is removed by filtration. The filtrate is concentrated under reduced pressure. The crystalline precipitate is collected by filtration and recrystallized from a mixture of ethanol and water to give 4-phenylacetyl - 7 - methoxy - 3,4 - dihydro-2(1H)-quinoxalinone as white crystals melting at 152 to 154° C.

Elementary analysis: Calculated (%): C, 68.90; H, 5.44; N, 9.46. Found (%): C, 68.77; H, 5.48; N, 9.41.

EXAMPLE 10

In the same manner as above, there is obtained 4-phenylpropionyl - 7 - methoxy-3,4-dihydro-2(1H)-quinoxalinone. M.P. 162–164° C.

EXAMPLE 11

In the same manner as above, there is obtained 4-phenylacetyl - 7 - methyl - 3,4 - dihydro-2(1H)-quinoxalinone. M.P. 148–149° C.

EXAMPLE 12

To a mixture of 7-methoxy-3,4-dihydro-2(1H)-quinoxalinone (5.0 g.) triethylamine (3.0 g.) and toluene (70 ml.), there is dropwise added cinnamoyl chloride (4.8 g.) in 20 minutes while stirring at room temperature. The resultant mixture is stirred at room temperature for 2 hours. The reaction mixture is concentrated under reduced pressure, and the residue is admixed with water (100 ml.). The precipitate is collected by filtration and washed with water (50 ml.) to give crude crystals of 4-cinnamoyl-7-methoxy-3,4-dihydro - 2(1H)-quinoxalinone. Recrystallization from aqueous dioxane affords pure crystals (5.5 g.) melting at 236 to 237° C.

Elementary analysis: Calculated (%): C, 70.11; H, 5.23; N, 9.09. Found (%): C, 69.64; H, 5.39; N, 8.90.

EXAMPLE 13

To a mixture of 7-methoxy-3,4-dihydro-2(1H)-quinoxalinone (5.0 g.), potassium carbonate (2.6 g.) and tetrahydrofuran (70 ml.), there is gradually added phenylacetyl chloride (4.5 g.), and the resultant mixture is stirred at 40 to 50° C. for 2 hours. The precipitate is separated by filtration. The filtrate is concentrated under reduced pressure. The residue is recrystallized from a mixture of ethanol and water to give 4-phenylacetyl-7-methoxy-3,4-dihydro-2(1H)-quinoxalinone as white crystals. M.P. 153–154.5° C.

Elementary analysis: Calculated (%): C, 68.90; H, 5.44; N, 9.46. Found (%): C, 69.02; H, 5.40; N, 9.52.

EXAMPLE 14

In the same manner as above, there is obtained 4-cinnamoyl-7-chloro-3,4-dihydro - 2(1H) - quinoxalinone. M.P. 221–222° C.

EXAMPLE 15

In the same manner as above, there is obtained 4-($\beta$-2'-furylacryloyl)-3,4-dihydro - 2(1H) - quinoxalinone. M.P. 252–254° C.

EXAMPLE 16

N-($\beta$-2'-furylacryloyl)-2-nitro - 4 - methoxyanilide (20 g.), iron powder (20 g.), ammonium chloride (20 g.) and water (80 ml.) are added to methanol (1000 ml.), and the resultant mixture is refluxed for 2 hours while stirring. 7 g. of sodium carbonate is then added gradually, and the reaction mixture is filtered while hot. The filtrate is diluted with water (600 ml.) and allowed to cool. After cooling, the light yellow precipitate is filtered, washed with aqueous methanol and dried to give $N^1$-($\beta$-2'-furylacryloyl) - 2 - amino - 4 - methoxyanilide (15 g.) melting at 165–166° C.

EXAMPLE 17

N-cinnamoyl-2-nitro-4-methoxyanilide (10 g.), iron powder (10 g.), ammonium chloride (10 g.) and water (40 ml.) are added to methanol (200 ml.), and the resultant mixture is refluxed for 5 hours while stirring. The reaction mixture is filtered while hot. The filtrate is concentrated under reduced pressure to a half volume, admixed with water (50 ml.) and cooled with ice. The separated crystals are collected by filtration and recrystallized from aqueous methanol to give N-cinnamoyl-2-amino-4-methoxyanilide (7 g.) melting at 215 to 216° C.

Elementary analysis for $C_{16}H_{16}N_2O_2$: Calculated (%): C, 71.62; H, 6.01; N, 10.44. Found (%): C, 71.30; H, 5.87; N, 10.37.

EXAMPLE 18

To a solution of N-cinnamoyl-2-nitro-4-methoxyanilide (20 g.) in tetrahydrofuran (170 ml.), there is added 5% palladiumcarbon (2 g.), and the resultant mixture is shaken in hydrogen atmosphere for 1.5 hours. The reaction mixture is filtered. The filtrate is concentrated under reduced pressure to dryness. The resulting white crystals are collected by filtration and washed with ether (20 ml.) to give $N^1$-($\beta$-phenylpropionyl)-2-amino-4-methoxyanilide in a quantitative yield. M.P. 146–147° C.

EXAMPLE 19

To a solution of N-phenylacetyl-2-nitro-4-methylanilide (8 g.) in tetrahydrofuran (60 ml.), there is added 5% palladiumcarbon (1 g.), and the resultant mixture is shaken in hydrogen atmosphere for 2 hours. The reaction mixture is filtered to separate the catalyst. The filtrate is concentrated under reduced pressure to dryness whereby $N^1$-phenylacetyl-2-amino-4-methylanilide is obtained in a nearly quantitative yield. M.P. 180–181° C.

EXAMPLE 20

To a solution of N-phenylacetyl-2-nitro-4-methoxyanilide (20 g.) in tetrahydrofuran (150 ml.), there is added 5% palladiumcarbon (1 g.), and the resultant mixture is shaken in hydrogen atmosphere for 3 hours. The reaction mixture is filtered to separate the catalyst. The filtrate is concentrated under reduced pressure to dryness. The residual white crystals are collected by filtration and washed with ether to give almost pure $N^1$-phenylacetyl-2-amino-4-methoxyanilide in a quantitative yield. M.P. 161–162° C.

EXAMPLE 21

To a solution of N-(2'-methyl-5'-methoxy-3'-indolylacetyl)-2-nitro-4-methoxyanilide (8 g.) in tetrahydrofuran (80 ml.), there is added 5% palladium carbon (1 g.), and the resultant mixture is shaken in hydrogen stream for 1.5 hours. The catalyst is separated by filtration. The filtrate is concentrated under reduced pressure to dryness. The residual crystalline solid is collected by filtration and washed with ether to give $N^1$-(2'-methyl-5'-methoxy-3'-indolylacetyl)-2-amino-4-methoxyanilide as white crystalline powder melting at 162 to 163° C. in a nearly quantitative yield.

EXAMPLE 22

A mixture of N-cinnamoyl-2-nitro-4-chloroanilide (20 g.), methanol (350 ml.), water (70 ml.) and ammonium chloride (20 g.) is refluxed while stirring, during which iron powder (20 g.) is portionwise added thereto in 15 minutes. Refluxing is further continued for 1 hour. After the gradual addition of sodium carbonate (6 g.), the reaction mixture is filtered while hot. The collected material on the filter is washed with hot methanol (100 ml.). The filtrate and the washing methanol are combined together, concentrated under reduced pressure to 200 ml. and diluted with water (100 ml.). The separated crystals are collected by filtration and washed with water to give $N^1$-cinnamoyl-2-amino-4-chloroanilide. M.P. 201–203° C.

EXAMPLE 23

To a mixture of $N^1$-chloroacetyl-2-amino-5-methoxyanilide (6.3 g.) and triethylamine (1.2 g.) in toluene (220 ml.), there is dropwise added cinnamoyl chloride (1.8 g.) at room temperature while stirring. After the dropwise addition is completed, the reaction mixture is warmed to 50° C. and concentrated under reduced pressure. The residue is washed with water and crystallized from acetone to give $N^1$-chloroacetyl-$N^2$-cinnamoyl-5-methoxy-o-phenylenediamide in a nearly quantitative yield. M.P. 179–180° C.

EXAMPLE 24

In the same manner as above, there is obtained $N^1$-chloroacetyl-$N^2$-($\beta$-2'-furylacryloyl) - 5 - methoxy-o-phenylene diamide. M.P. 183–184° C.

EXAMPLE 25

A mixture of $N^1$-(2'-methyl-5'-methoxy - 3' - indolylacetyl)-2-amino-4-methoxyanilide (10 g.), methyl monochloroacetate (60 ml.) and 10% sodium hydroxide solution (14 g.) is stirred while cooling with ice, during which chloroacetyl chloride (4.5 g.) is dropwise added in 10 minutes. The resultant mixture is stirred at room temperature for 3 hours. The precipitate is collected by filtration, washed with water and recrystallized from aqueous dioxane to give $N^1$-(2'-methyl-5'-methoxy - 3' - indolylacetyl)-$N^2$-chloroacetyl-4-methoxy-o-phenylene diamide (8 g.) as white crystals melting at 214 to 215° C.

EXAMPLE 26

A mixture of $N^1$-cinnamoyl-2-amino-4-chloroanilide (8 g.), methyl monochloroacetate (30 ml.) and 10% sodium hydroxide solution (20 g.) is stirred while cooling with ice, during which chloroacetyl chloride (4.6 g.) is dropwise added in 10 minutes. Stirring is further continued for 3 hours at room temperature. The precipitate is collected by filtration, washed with water and recrystallized from aqueous acetone to give $N^1$-cinnamoyl-$N^2$-chloroacetyl-4-chloro-o-phenylene diamide (6.5 g.). M.P. 162–164° C.

EXAMPLE 27

A mixture of $N^1$-phenylacetyl-2-amino-4-methylanilide (5 g.), methyl monochloroacetate (20 ml.) and 10% sodium hydroxide solution (12 g.) is stirred while cooling with ice, during which chloroacetyl chloride (2.8 g.) is dropwise added. After the dropwise addition is completed, stirring is further continued at room temperature for 3 hours. The precipitate is collected by filtration, washed with water and recrystallized from aqueous acetone to give $N^1$-phenylacetyl-$N^2$-chloroacetyl-4-methyl-o - phenylene diamine (3.5 g.) as white crystals melting at 168 to 169° C.

EXAMPLE 28

A mixture of $N^1$-($\beta$-phenylpropionyl)-2-amino-4-methoxyanilide (15 g.), methyl monochloroacetate (50 ml.) and 10% sodium hydroxide solution (40 g.) is stirred while cooling with ice, during which chloroacetyl chloride (9 g.) is dropwise added in 15 minutes. Then, the resultant mixture is stirred at room temperature for 3 hours. The precipitate is collected by filtration, washed with water and recrystallized from a mixture of acetone and water to give $N^1$-($\beta$-phenylpropionyl)-$N^2$-chloroacetyl-4-methoxy-o-phenylene diamide (14 g.) as white crystals melting at 153 to 154° C.

EXAMPLE 29

A mixture of $N^1$-phenylacetyl-2-amino-4-methyoxyanilide (13 g.), methyl monochloroacetate (70 ml.) and 10% sodium hydroxide solution (30 g.) is stirred while cooling with ice, during which chloroacetyl chloride (7.3 g.) is dropwise added in 15 minutes. Stirring is continued at room temperature for 3 hours. The precipitate is collected by filtration, washed with water and recrystallized from 80% dioxane to give $N^1$-phenylacetyl-$N^2$-chloroacetyl-4-methoxy-o-phenylene diamide (12 g.) as white crystals melting at 176 to 177° C.

EXAMPLE 30

In the same manner as above, there is obtained $N^1$-cinnamoyl-$N^2$-chloroacetyl-4-methoxy-o-phenylene diamide. M.P. 179–180° C.

EXAMPLE 31

In the same manner as above, there is obtained $N^1$-($\beta$-2'-furylacryloyl)-$N^2$-chloroacetyl)-4-methoxy-o - phenylene diamide. M.P. 183–184° C.

EXAMPLE 32

To a mixture of $N^1$-(2-nitro-4-methoxyphenyl)-glycine ethyl (5.1 g.) and triethylamine (3.0 g.) in benzene, there is dropwise added cinnamoyl chloride (4.0 g.) while stirring under cooling with ice. After the dropwise addition is completed, stirring is continued at room temperature for 30 minutes. Then, the resultant mixture is mildly heated for 1 hour. The solvent is removed by distillation under reduced pressure. The residue is washed with water, extracted with hot ethanol and subjected to recrystallization to give $N^1$-cinnamoyl-$N^1$-(2-nitro-4-methoxyphenyl-glycine ethyl (4.8 g.).

Elementary analysis for $C_{20}H_{20}N_2O_6$: Calculated (%): C, 62.49; H, 5.24; N, 7.29. Found (%): C, 62.36; H, 5.53; N, 7.43.

EXAMPLE 33

In the same manner as above, there is obtained $N^1$-($\beta$-2'-furylacryloyl)-$N^1$-(2-nitro-4-methoxyphenyl) - glycine ethyl.

The compounds of the present invention, due inter alia to their excellent anti-inflammatory action with concomitant low toxicity are effective in the treatment of rheumatoid arthritis, gouty arthritis, macular rheumatism and other disaffections involving inflammation. The compounds are administered in the form of tablet, capsule or the like with a suitable and per se conventional pharmaceutically acceptable carrier. Usually the preparation is orally administered and the dosage is 200 to 600 mg. per day for a patient.

What we claim is:

1. A 4-acyl-3,4-dihydro-2(1H)-quinoxalinone derivative of the formula:

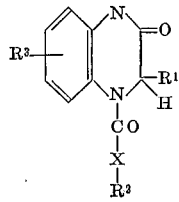

wherein:

$R^1$ is a member selected from the group consisting of hydrogen and lower alkyl;

$R^2$ is a member selected from the group consisting of phenyl, naphthyl, furyl, thienyl, pyridyl, indolyl and such groups substituted with halogen, lower alkoxy, nitro or lower alkyl;

$R^3$ is a member selected from the group consisting of hydrogen, halogen, lower alkoxy, lower alkylthio and lower alkyl group; and X is a member selected from the group consisting of methylene, ethylene, propylene, butylene, vinylene, allylene and butadiene groups.

2. A compound of claim 1 wherein the said $R^2$ group is substituted by a member selected from the group consisting of halogen, lower alkoxy, a nitro group, and a lower alkyl.

3. A compound according to claim 1, namely, 4-cinnamoyl-7-methoxy-3,4-dihydro-2(1H)-quinoxalinone.

4. A compound according to claim 1, namely, 4-cinnamoyl-7-chloro-3,4-dihydro-2(1H)-quinoxalinone.

5. A process for preparing 4-acyl-3,4-dihydro-2(1H)-quinoxalinone derivative which comprises reacting a phenylene diamide compound of the formula:

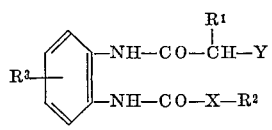

wherein:

$R^1$ is a member selected from the group consisting of hydrogen and lower alkyl;

$R^2$ is a member selected from the group consisting of phenyl, naphthyl, furyl, thienyl, pyridyl, indolyl and such groups substituted with halogen, lower alkoxy, nitro or lower alkyl;

$R^3$ is a member selected from the group consisting of hydrogen, halogen, lower alkoxy, lower alkylthio and lower alkyl groups;

X is a member selected from the group consisting of methylene, ethylene, propylene, butylene, vinylene, allylene and butadiene groups; and Y is halogen, with a compound selected from the group consisting of an alkali metal hydroxide, an alkali metal carbonate, an alkali metal bicarbonate, an alkali metal alkoxide, and an organic amine.

6. The process of prepring 4-acyl-3,4-dihydro-2(1H)-quinoxalinone derivatives according to claim 5 wherein the said phenyl diamine compound is prepared by reacting an o-aminoanilide derivative of the formula

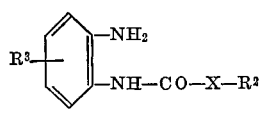

with a compound of the formula:

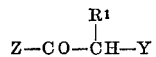

wherein Z represents halogen, and $R^1$, $R^2$, $R^3$, X and Y are as defined in claim 5.

7. The process of preparing 4-acyl-3,4-dihydro-2-(1H)-quinoxalinone derivatives according to claim 6 wherein the said o-aminoanilide derivative is prepared by reacting an o-nitronilide derivative of the formula:

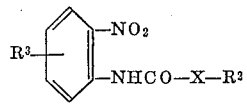

with hydrogen in the presence a metal, wherein $R^3$, X and $R^2$ are as defined in claim 5.

8. The process of preparing 4-acyl-3,4-dihydro-2(1H)-quinoxalinone derivatives according to claim 5 wherein the said phenylene diamine compound is prepared by reacting an o-aminoanilide derivative of the formula:

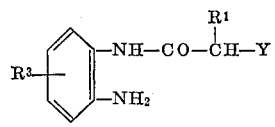

with a compound of the formula

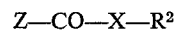

wherein $R^1$, $R^2$, $R^3$, X and Y are as defined in claim 5 and Z is halogen.

9. A process for preparing 4-acyl-3,4-dihydro-2-(1H)-quinoxalinone derivatives which comprises reacting an N-(o-nitrophenyl)-N-acylglycine derivative of the formula:

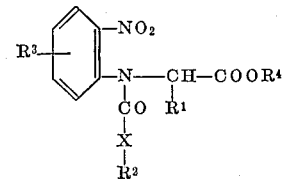

wherein $R^1$ is a member selected from the group consisting of hydrogen and lower alkyl;

$R^2$ is a member selected from the group consisting of phenyl, naphthyl, furyl, thienyl, pyridyl, indolyl and such groups substituted with halogen, lower alkoxy, nitro or lower alkyl;

$R^3$ is a member selected from the group consisting of hydrogen, halogen, lower alkoxy, lower alkylthio and lower alkyl groups;

X is a member selected from the group consisting of methylene, ethylene, propylene, butylene, vinylene, allylene and butadiene groups; and $R^4$ is hydrogen, lower alkyl, or benzyl, with hydrogen in the presence of a catalyst selected from the group consisting of a metal and a metal compound.

10. The process of preparing 4-acyl-3,4-dihydro-2(1H)-quinoxalinone derivatives according to claim 9 wherein the said N-(o-nitrophenyl)-N-acylglycine is prepared by reacting a phenylglycine derivative of the formula

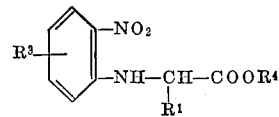

with a compound of the formula:

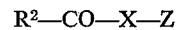

wherein $R^1$, $R^2$, $R^3$, $R^4$, and X are as defined in claim 9 and Z is halogen.

11. A process for preparing 4-acyl-3,4-dihydro-2(1H)-quinoxalinone derivatives which comprises reacting a quinoxalinone compound of the formula:

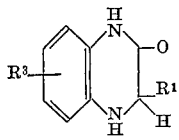

wherein:

$R^1$ is a member selected from the group consisting of hydrogen and lower alkyl; and $R^3$ is a member selected from the group consitsing of hydrogen, halogen, lower alkoxy, lower alkylthio and lower alkyl group, with a compound of the formula:

$$R^2-X-CO-Z$$

wherein:

R is a member selected from the group consisting of phenyl, naphthyl, furyl, thienyl, pyridyl, indolyl and such groups substituted with halogen, lower alkoxy, nitro or lower alkyl;

X is a member selected from the group consisting of methylene, ethylene, propylene, butylene, vinylene, allylene and butadiene groups; and Z is halogen, in the presences of a compound selected from the group consisting of tertiary amine, an alkali metal hydroxide, an alkali metal carbonate, and an alkali metal bicarbonate.

References Cited

UNITED STATES PATENTS 3,366,628   1/1968   Wendt et al. _____ 260—250

NICHOLAS S. RIZZO, Primary Examiner

U.S. Cl. X.R.

260—250; 424—250